THOMAS P. SINK'S
IMPROVEMENTS IN OYSTER DREDGES.

No. 120,463.  Patented Oct. 31, 1871.

WITNESSES:

INVENTOR:

//120,463

UNITED STATES PATENT OFFICE.

THOMAS P. SINK, OF FAIRTON, NEW JERSEY.

IMPROVEMENT IN OYSTER-DREDGES.

Specification forming part of Letters Patent No. 120,463, dated October 31, 1871.

*To all whom it may concern:*

Be it known that I, THOMAS P. SINK, of Fairton, in the county of Cumberland, and State of New Jersey, have invented Improvements in Oyster-Dredges, and I do hereby declare the following to be a full, clear, and correct description of the same, reference being had to the accompanying drawing, in which—

Figure 1:
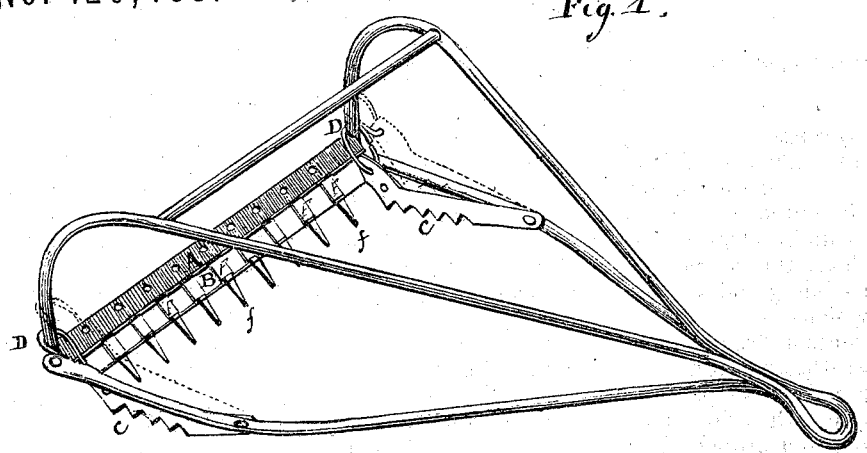
Figure 2:
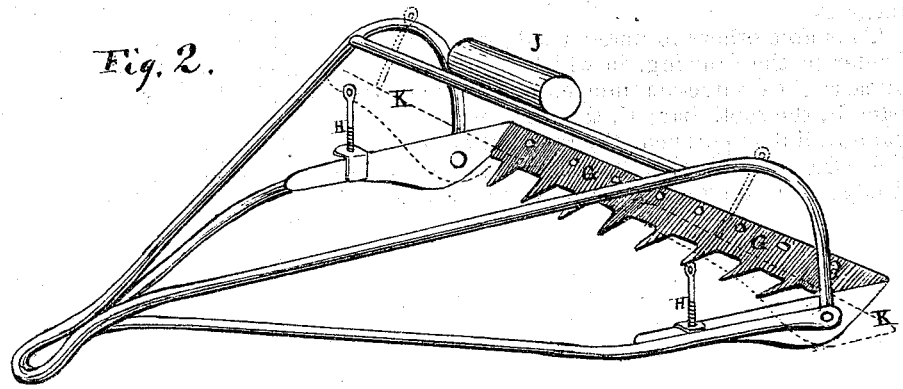

Figure 1 represents a dredge, showing a rake with adjustable teeth, and hung by its arms to the dredge-frame with bolts or pivots. Fig. 2 represents a dredge with a float and set-screws for setting the rake to a proper pitch.

The nature of my invention consists of constructing oyster-dredges with a rake that adjusts itself to the oyster-bed independent of the weight of the dredge-frame. Also, of set-screws for the purpose of setting and keeping the dredge-rake to a proper pitch, as may be required for either hard or soft oyster-beds, and so that the operator can use the tooth-bar as a scraper without teeth, which is frequently needed on some kinds of oyster-beds.

To enable others to understand my invention, I refer to the drawing, in which A marks a bar to carry the dredge-net independent of the tooth-bar; B, the tooth-bar; C, the arms of the tooth-bar; D, links to prevent the rake falling too low. F are the adjustable teeth. G, at Fig. 2, shows a dredge-rake hung on pivots near the tooth-bar. H are set-screws for regulating the pitch of the rake. J shows a float or air-chamber, made of any suitable material, and attached to the top of the dredge for keeping it right side up as it falls to the oyster bed. K K are lines showing the position of the rake at G G, as it tips up by the weight of the oysters in the net when it leaves the bottom, till it is boarded. By this means the rake prevents the oysters falling out of the net as heretofore.

What I claim as my invention, and desire to secure by Letters Patent, is—

1. The tooth-bar of an oyster-dredge, constructed with set-screws for the purpose of regulating the pitch of the rake, as herein shown and described.

2. A float fixed to the frame-work of an oyster-dredge, as herein described, and for the purpose set forth.

3. The float J, the set-screws H, and links D, in combination with an oyster-dredge, substantially in the manner set forth and shown by the drawing.

The above specification of my said invention signed and witnessed at Fairton this 30th day of March, A. D. 1871.

THOMAS P. SINK.

Witnesses:
JONATHAN WOOD,
THOMAS WELHAM.

(143)